US009485238B2

United States Patent
Knox et al.

(10) Patent No.: US 9,485,238 B2
(45) Date of Patent: *Nov. 1, 2016

(54) SECURITY FRAMEWORK FOR HTTP STREAMING ARCHITECTURE

(71) Applicant: Akamai Technologies, Inc., Cambridge, MA (US)

(72) Inventors: Christopher R. Knox, San Diego, CA (US); William Law, San Mateo, CA (US); Thomas Devanneaux, Los Altos, CA (US); Nicholas Shayne Brookins, San Diego, CA (US); Akinwale Olugbemiga Olugbile, San Diego, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,322

(22) Filed: Jun. 4, 2014

(65) Prior Publication Data

US 2014/0337958 A1     Nov. 13, 2014

Related U.S. Application Data

(63) Continuation of application No. 12/980,996, filed on Dec. 29, 2010, now Pat. No. 8,769,614.

(60) Provisional application No. 61/290,732, filed on Dec. 29, 2009.

(51) Int. Cl.
*H04L 29/06*      (2006.01)
*H04N 21/472*     (2011.01)

(52) U.S. Cl.
CPC .............. *H04L 63/08* (2013.01); *H04L 63/04* (2013.01); *H04L 65/1069* (2013.01); *H04L 65/4084* (2013.01); *H04L 29/06448* (2013.01); *H04L 29/06462* (2013.01); *H04N 21/47202* (2013.01)

(58) Field of Classification Search
CPC ................. H04L 29/06448; H04L 29/06462; H04L 65/4084; H04L 63/04; H04L 63/08; H04N 21/472; H04N 21/47202
See application file for complete search history.

(56) References Cited

U.S. PATENT DOCUMENTS

| 6,058,418 A | 5/2000 | Kobata |
| 6,098,180 A | 8/2000 | Kobata et al. |

(Continued)

OTHER PUBLICATIONS

Towes, Kevin, et al., "Video content protection measures enabled by Adobe® Flash® Media Interactive Server 3" Adobe Systems, Inc. Technical Whitepaper, Apr. 2008, 28 pages.

(Continued)

*Primary Examiner* — Eleni Shiferaw
*Assistant Examiner* — Nelson Giddins

(57) ABSTRACT

Methods and apparatus for preventing unauthorized access to online content, including in particular streaming video and other media, are provided. In various embodiments, techniques are provided to authorize users and to authenticate clients (e.g., client media players) to a content delivery system. The content delivery system may comprise a content delivery network with one or more content or "edge" servers therein. The requesting client is sent a program at the time of content delivery. The program may be embedded in the content stream, or sent outside of the stream. The program contains instructions that are executed by the client and cause it to return identifying information to the content delivery system, which can then determine whether the client player is recognized and, if so, authorized to view the content. Unrecognized and/or altered players may be prevented from viewing the content.

8 Claims, 10 Drawing Sheets

(56) References Cited

U.S. PATENT DOCUMENTS

| | | | |
|---|---|---|---|
| 6,108,703 A | 8/2000 | Leighton et al. | |
| 6,393,471 B1 | 5/2002 | Kobata | |
| 6,718,328 B1 | 4/2004 | Norris | |
| 6,751,673 B2 | 6/2004 | Shaw | |
| 6,823,366 B1* | 11/2004 | Nakano | H04L 29/06 709/206 |
| 6,959,384 B1* | 10/2005 | Serret-Avila | G06F 21/64 713/161 |
| 7,017,188 B1* | 3/2006 | Schmeidler | G06F 21/10 705/57 |
| 7,111,057 B1 | 9/2006 | Sherman et al. | |
| 7,114,008 B2* | 9/2006 | Jungck | H04L 47/10 709/205 |
| 7,162,475 B2* | 1/2007 | Ackerman | G06F 21/32 |
| 7,191,332 B1* | 3/2007 | Pankajakshan | H04L 63/0428 713/160 |
| 7,240,100 B1 | 7/2007 | Wein et al. | |
| 7,296,082 B2 | 11/2007 | Leighton et al. | |
| 7,363,361 B2* | 4/2008 | Tewari | H04L 12/14 709/223 |
| 7,376,716 B2 | 5/2008 | Dilley et al. | |
| 7,472,178 B2 | 12/2008 | Lisiecki et al. | |
| 7,552,338 B1* | 6/2009 | Swildens | G06Q 20/401 713/150 |
| 7,558,870 B2* | 7/2009 | Parker | H04H 20/82 709/231 |
| 7,640,435 B2* | 12/2009 | Morten | G06F 21/10 380/281 |
| 7,690,039 B2* | 3/2010 | Schmeidler | G06F 21/10 380/229 |
| 7,860,013 B2* | 12/2010 | Michel | H04N 7/17318 370/241 |
| 8,011,015 B2* | 8/2011 | Singer | G06F 21/10 380/201 |
| 8,078,725 B2* | 12/2011 | Tan | G06F 21/10 705/55 |
| 8,108,620 B2 | 1/2012 | Anderson et al. | |
| 8,131,646 B2* | 3/2012 | Kocher | G06F 21/10 370/270 |
| 8,171,463 B2* | 5/2012 | Taneda | G06F 3/1204 358/1.1 |
| 8,225,377 B2 | 7/2012 | Maffione et al. | |
| 8,271,793 B2* | 9/2012 | Swildens | G06Q 20/401 713/150 |
| 8,291,228 B2* | 10/2012 | Laidlaw | H04L 63/08 713/176 |
| 8,769,614 B1 | 7/2014 | Knox et al. | |
| 8,873,751 B2 | 10/2014 | Knox et al. | |
| 9,043,481 B1* | 5/2015 | Jun | G06F 21/10 709/225 |
| 2001/0051980 A1* | 12/2001 | Raciborski | G06F 17/30864 709/203 |
| 2002/0170053 A1 | 11/2002 | Peterka et al. | |
| 2003/0028664 A1* | 2/2003 | Tan | G06F 21/10 709/237 |
| 2003/0140257 A1* | 7/2003 | Peterka | F28F 13/02 726/12 |
| 2004/0093419 A1 | 5/2004 | Weihl et al. | |
| 2004/0237100 A1* | 11/2004 | Pinder | H04N 7/162 725/31 |
| 2005/0005146 A1* | 1/2005 | Kryeziu | G06F 21/31 713/193 |
| 2006/0064588 A1* | 3/2006 | Tidwell | G06F 21/316 713/169 |
| 2006/0085824 A1* | 4/2006 | Bruck | H04N 7/17336 725/86 |
| 2006/0168626 A1* | 7/2006 | Vorlicek | H04N 7/17309 725/62 |
| 2007/0094691 A1* | 4/2007 | Gazdzinski | H04N 7/17318 725/62 |
| 2007/0282750 A1* | 12/2007 | Homiller | G06F 21/10 705/52 |
| 2008/0092220 A1* | 4/2008 | Tan | G06F 21/10 726/9 |
| 2008/0104684 A1* | 5/2008 | Lunde | H04L 63/04 726/6 |
| 2008/0189752 A1* | 8/2008 | Moradi | H04L 29/06027 725/105 |
| 2008/0200154 A1* | 8/2008 | Maharajh | G06F 17/30035 455/414.3 |
| 2009/0077601 A1* | 3/2009 | Brailean | H04L 29/06027 725/109 |
| 2009/0106360 A1* | 4/2009 | Peng | H04L 65/4084 709/203 |
| 2009/0164579 A1* | 6/2009 | Chaudhry | H04L 63/08 709/205 |
| 2009/0165105 A1* | 6/2009 | Chaudhry | H04L 63/166 726/7 |
| 2009/0165115 A1* | 6/2009 | Toumura | H04L 67/2838 726/12 |
| 2009/0259853 A1* | 10/2009 | Swildens | G06Q 20/401 713/176 |
| 2009/0271319 A1* | 10/2009 | Bromley | G11B 20/00086 705/59 |
| 2009/0300746 A1* | 12/2009 | Ahn | G06F 21/34 726/9 |
| 2010/0024024 A1* | 1/2010 | Siourthas | G06F 21/35 726/9 |
| 2010/0031022 A1* | 2/2010 | Kramer | G06F 21/6218 713/155 |
| 2010/0077463 A1* | 3/2010 | Rickelton-Abdi | G06F 21/10 726/5 |
| 2010/0122303 A1* | 5/2010 | Maloney | G06F 21/10 725/87 |
| 2010/0131671 A1* | 5/2010 | Kohli | H04L 65/60 709/233 |
| 2010/0180029 A1* | 7/2010 | Fourman | G06F 17/30867 709/225 |
| 2010/0299722 A1* | 11/2010 | Tewari | H04L 12/14 726/3 |
| 2010/0313250 A1* | 12/2010 | Chow | G06F 17/30899 726/5 |
| 2010/0313257 A1* | 12/2010 | Padinjareveetil | H04L 63/08 726/8 |
| 2011/0038470 A1* | 2/2011 | Kent | H04M 15/06 379/142.04 |
| 2011/0197237 A1* | 8/2011 | Turner | H04N 21/2343 725/78 |
| 2011/0255690 A1* | 10/2011 | Kocher | G06F 21/10 380/210 |
| 2011/0265159 A1* | 10/2011 | Ronda | H04L 63/0853 726/6 |
| 2012/0027210 A1* | 2/2012 | Takeuchi | H04L 9/0861 380/255 |
| 2012/0084765 A1* | 4/2012 | Lee | G06F 8/65 717/172 |
| 2012/0088477 A1* | 4/2012 | Cassidy | |
| 2012/0185695 A1* | 7/2012 | Shah | H04L 9/0822 713/172 |
| 2012/0209949 A1 | 8/2012 | Deliyannis | |
| 2012/0239407 A1* | 9/2012 | Lynch | G06Q 30/0201 704/500 |

OTHER PUBLICATIONS

Adobe Systems, Inc. "SWF File Format Specification Version 10", Nov. 2008, 278 pages.

U.S. Appl. No. 14/523,974.

* cited by examiner

SECURITY FRAMEWORK FOR HTTP STREAMING ARCHITECTURE

This application is a continuation of U.S. patent application Ser. No. 12/980,996, filed Dec. 29, 2010, which claims the benefit of priority of U.S. Provisional Application No. 61/290,732, filed Dec. 29, 2009, the disclosure of both of which are hereby incorporated by reference.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

TECHNICAL FIELD

The present disclosure generally relates to delivery online of video and other content, and to securing such delivery to prevent unauthorized access thereto.

BACKGROUND

Distributed computer systems are known in the art. One such distributed computer system is a "content delivery network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS request handling, provisioning, data monitoring and reporting, content targeting, personalization, and business intelligence.

While content delivery networks provide significant advantages, typically they include dedicated platforms to support delivery of content for multiple third party runtime environments that are, in turn, based on their own proprietary technologies, media servers, and protocols. These distinct platforms are costly to implement and to maintain, especially globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as the Apple® iPhone® to receive and view content over mobile environments.

Thus, there is a need to provide an integrated, secure content delivery network platform with the ability to deliver online content (such as HD-quality video) at broadcast audience scale to the most popular runtime environments (such as Adobe® Flash®, Microsoft® Silverlight®, etc.) as well as to mobile devices such as the iPhone to match what viewers expect from traditional broadcast TV. The techniques disclosed herein address this need.

SUMMARY

Disclosed herein are methods and systems for delivering video and other forms of content over the Internet, and other networks, while preventing unauthorized access thereto. Architectures for live streaming and video-on-demand functionality, among others, are discussed.

In one embodiment, for example, a method for authenticating client devices (e.g., a client computer running a media player application) that request streaming content includes receiving a request for streaming content (e.g., video) from a client (e.g., a media player running on a user computer) at a content delivery system. Such a content delivery system may be implemented with a content delivery network having one or more content or "edge" servers therein, a given content server receiving HTTP or other requests for content from clients. The method includes, at the time of delivery of the streaming content, sending a program to the requesting client. Typically, the program is a set of one or more instructions for the client to execute. The program may be a file, such as a SWF file or other file, with one or more functions defined therein. The program is executed by the client and inspects and/or determines information about the client, such as an identifier associated with the client. The identifier may represent an identifier of player (e.g., a byte array thereof), a hardware identifier for the device itself, and/or combination of player software and hardware represented by the device). The information may represent a class number, unique serial number, an authentication code, or other kind of information. The information is sent to the content delivery system. It may be encoded into a token (e.g., using a hash algorithm) before being sent.

The content delivery system receives the information identifying the requesting client. Typically, the information will be returned to the given content server from which the client originally requested the content. That content server, or another machine in the system, determines whether the requesting client is recognized for purposes of receiving the streaming content. Such determination can be made based, at least in part, on the information sent from the client in accordance with the program instructions. (For example, the content server can compute its own token based on the byte array of the player, or other information associated therewith, and compare it to the received token.) Recognized clients may or may not be then subject to a further authorization procedure. In other words, in some implementations, a client player may be recognized but not authorized to play the streaming content.

In some embodiments, if it is determined that requesting client is recognized, the content delivery system can continue with the streaming of the content. If not, then the content delivery system can abort delivery of the content stream, if it has begun, or deny access in the first place.

In related embodiments, the sending of the program to the requesting client at the time of delivery of the streaming content can be accomplished by sending the program at the initiation of content delivery. In other cases, it may be sent during content delivery (e.g., within some given time from the initiation of the streaming content). The program may be embedded within the streaming content or sent separately, such as a through an out of band HTTP connection to the content server serving the stream or another machine, or otherwise outside of the content stream. Such alternative functionality may be configurable in the content delivery system using metadata configuration of the content servers.

In related embodiments, the program sent to the client specifies the encoding to be used to create the aforementioned token from the client identifying information (e.g., by specifying a particular hashing algorithm to use). In some embodiments, the token may be created by taking a hash of the client identifying information combined with a challenge, session id, or other information sent to the client by the content delivery system along with the program.

The determination of whether the requesting client is recognized can be accomplished by the content delivery system, or more particularly the given content server within it, comparing the token received from the client with a token it computes using the same encoding mechanism (e.g., the same hashing algorithm) on a known client identifier (e.g., a known client byte array). The determination also can be made without using tokens and by comparing the client identifying information with a list of known clients accessible to the content delivery system.

Further embodiments include such servers, client devices, content delivery network devices, and other digital data processing components with processors and stored instructions sufficient, when executing those stored instructions, to carry out the above-described functionality.

The foregoing summary is not limiting but merely describes illustrative features of the methods and devices disclosed herein, which will be discussed in more detail in the sections that follow.

BRIEF DESCRIPTION OF THE DRAWINGS

The invention will be more fully understood from the following detailed description taken in conjunction with the accompanying drawings, in which.

DETAILED DESCRIPTION

The following detailed description sets forth embodiments to provide an overall understanding of the principles of the structure, function, and use of the methods and systems disclosed herein. The methods and systems described herein and illustrated in the accompanying drawings are non-limiting examples; the scope of the present invention is defined solely by the claims. The features described or illustrated in connection with one embodiment may be combined with the features of other embodiments. Such modifications and variations are intended to be included within the scope of the present invention. All patents, publications and references cited herein are expressly incorporated herein by reference in their entireties.

1.0 Distributed Computer System

Figure 1:
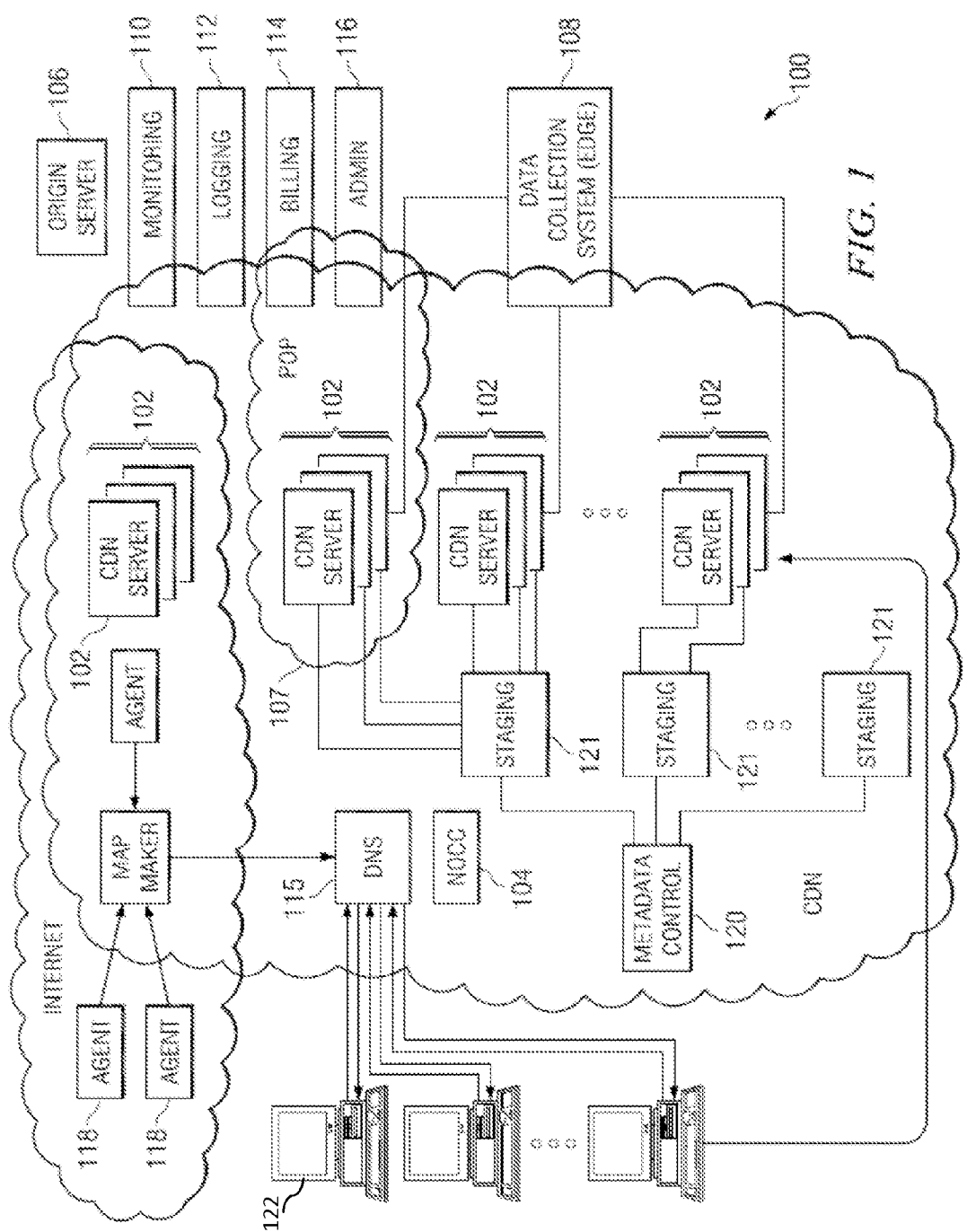
FIG. 1 is a block diagram of a content delivery network (CDN) in which the present invention may be implemented.

FIG. 1 illustrates a known distributed computer system, modified by the teachings hereof to provide a single HTTP-based platform with the ability to deliver online video (or other media) at broadcast audience scale, and to provide security techniques preventing unauthorized access thereto.

In a known system, such as shown in FIG. 1, a distributed computer system 100 is configured as a CDN and is assumed to have a set of machines 102 distributed around the Internet. Typically, most of the machines are servers located near the edge of the Internet, which includes locations at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to content servers running on the machines 102. In some cases, the content servers may be located at the "edge" of a network, as mentioned above, and if so referred to as "edge" servers. Typically, content providers offload their content delivery by aliasing (e.g., by a DNS CNAME) given content provider domains or sub-domains to domains that are managed by the service provider's authoritative domain name service, more details of which are set forth in U.S. Pat. Nos. 7,293,093 and 7,693,959, the disclosures of which are incorporated by reference herein. End users operating client machines 122 that desire the content are directed to the distributed computer system 100, and more particularly to one of its machines 102, to obtain that content more reliably and efficiently.

The distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the content servers. More about the distribution of control information in a CDN can be found in U.S. Pat. No. 7,240,100, the disclosure of which is hereby incorporated by reference in its entirety.

Figure 2:
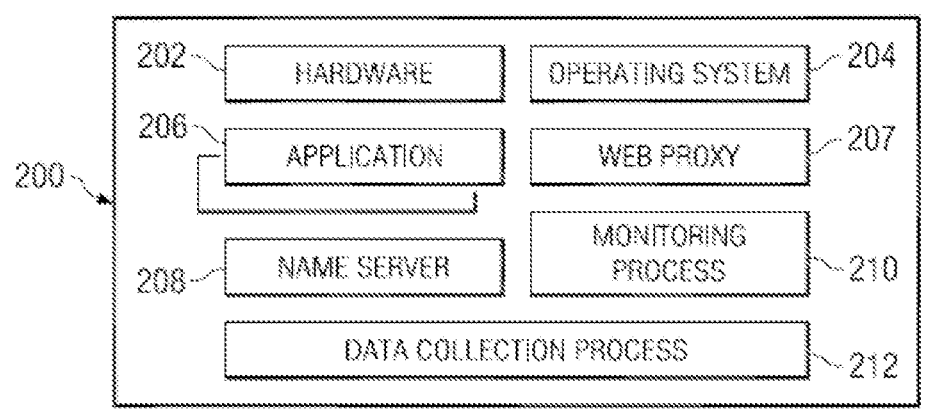
FIG. 2 is a simplified block diagram of a content server in a CDN.

As illustrated in FIG. 2, a given machine 200 comprises commodity hardware 202 (e.g., an Intel Pentium or other processor) running an operating system kernel (such as Linux or Linux variant) 204 that supports one or more applications 206. To facilitate content delivery services as a content server, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

Client machines 122 include conventional personal computers, laptops, other digital data processing devices. Client machines also include mobile clients, which may include any a variety of mobile devices often referred to as smartphones, cell phones, and/or personal digital assistants (PDAs).

A CDN content server may be configured to provide one or more extended content delivery features, preferably on a domain-specific, customer-specific basis, preferably using configuration files that are distributed to the content servers using a configuration system. A given configuration file preferably is XML-based and includes a set of content handling rules and directives that facilitate one or more advanced content handling features. The configuration file may be delivered to the CDN content server via the data transport mechanism. U.S. Pat. No. 7,111,057, the disclosure of which is incorporated herein by reference, illustrates a useful infrastructure for delivering and managing content server content control information, and this and other server control information can be provisioned by the CDN service provider itself, or (via an extranet or the like) the content provider customer who operates the origin server.

The CDN may include a storage subsystem (NetStorage), such as described in U.S. Pat. No. 7,472,178, the disclosure of which is incorporated herein by reference.

The CDN may operate a server cache hierarchy (Cache-H) to provide intermediate caching of customer content; one such cache hierarchy subsystem is described in U.S. Pat. No. 7,376,716, the disclosure of which is incorporated herein by reference.

For live streaming delivery, the CDN may include a delivery subsystem, such as described in U.S. Pat. No. 7,296,082, the disclosure of which is incorporated herein by reference.

The CDN may provide secure content delivery among a client browser, content server and customer origin server in the manner described in U.S. Publication No. 2004/0093419 and/or U.S. Pat. No. 7,363,361, the disclosures of which are both incorporated herein by reference. Secure content delivery as described therein enforces SSL-based links between the client and the content server process, on the one hand, and between the content server process and an origin server process, on the other hand. This enables an SSL-protected web page and/or components thereof to be delivered via the content server.

For live streaming delivery, the CDN may include a live delivery subsystem, such as described in U.S. Pat. No. 7,296,082, the disclosure of which is incorporated herein by reference.

The above-identified technologies can be extended to create an integrated, secure, HTTP-based delivery platform that provides for the online delivery of HD-video quality content (and other media) to various runtime environments. The platform supports delivery of both "live" and "on-demand" content.

2.0 Live Streaming Delivery

As used herein, the following terms shall have the following representative meanings. For convenience of illustration only, the description that follows (with respect to live streaming delivery) is presented in the context of the Adobe® Flash® runtime environment, but this is not a limitation, as a similar type of solution may also be implemented for other runtime environments both fixed line and mobile (including, without limitation, Microsoft® Silverlight®, Apple® iPhone®, and others).

An Encoder is a customer-owned or managed machine which takes some raw video feed (e.g., live video) in some format (streaming, satellite, etc.) and delivers the data to an Entry Point encoded for streaming delivery. An Entry Point (EP) typically is a process running on a CDN streaming machine which receives video data from the customer's Encoder and makes this data available to consumers of the live stream. For Adobe Flash, this is a Flash Media Server (FMS) configured to accept connections from Encoders. A Flash Media Server is a server process for Flash media available from Adobe Corporation. In this embodiment, an Intermediate Region (IR) typically is a Flash Media Server which the CDN has configured to act analogously to a streaming set reflector, such as described in U.S. Pat. No. 7,296,082 and U.S. Pat. No. 6,751,673, the disclosures of which are hereby incorporated by reference. These machines relay streams from FMS EPs to FMS Edge regions, providing fan out and path diversity. A "Region" typically implies a set of machines (and their associated server processes) that are co-located and are interconnected to one another for load sharing, typically over a back-end local area network. A Flash Edge machine is a Flash Media Server which has been configured to accept client requests. This is the software running on the Flash EP, IR, and Edge machines in a representative embodiment. Intermediate Format (IF) is an internal (to the CDN) format for sending streaming data from EP to an edge server HTTP proxy. As will be described in more detail below, in certain implementations IF preferably comprises several different pieces, including "Stream Manifest," "Fragment Indexes," and "IF Fragments." Live, DVR and VOD are defined as follows: "Live" refers to media served in real time as an event occurs; "DVR" refers to serving content acquired from a "live" feed but served at a later time; "VOD" refers to media served from a single, complete (i.e., not incrementally changing) file or set of files. Real Time Messaging Protocol (RTMP) is the streaming and RPC protocol used by Flash. Real Time Messaging Protocol Encrypted (RTMPE) is the encrypted version of RTMP using secrets built into the server and client. "SWF" or "Small Web Format" is the format for Flash client applications. SWF verification refers to a technique by which the Flash Player can authenticate to FMS that it is playing an unmodified SWF by sending hashes of the SWF itself along with secrets embedded in the client and server.

Figure 3:
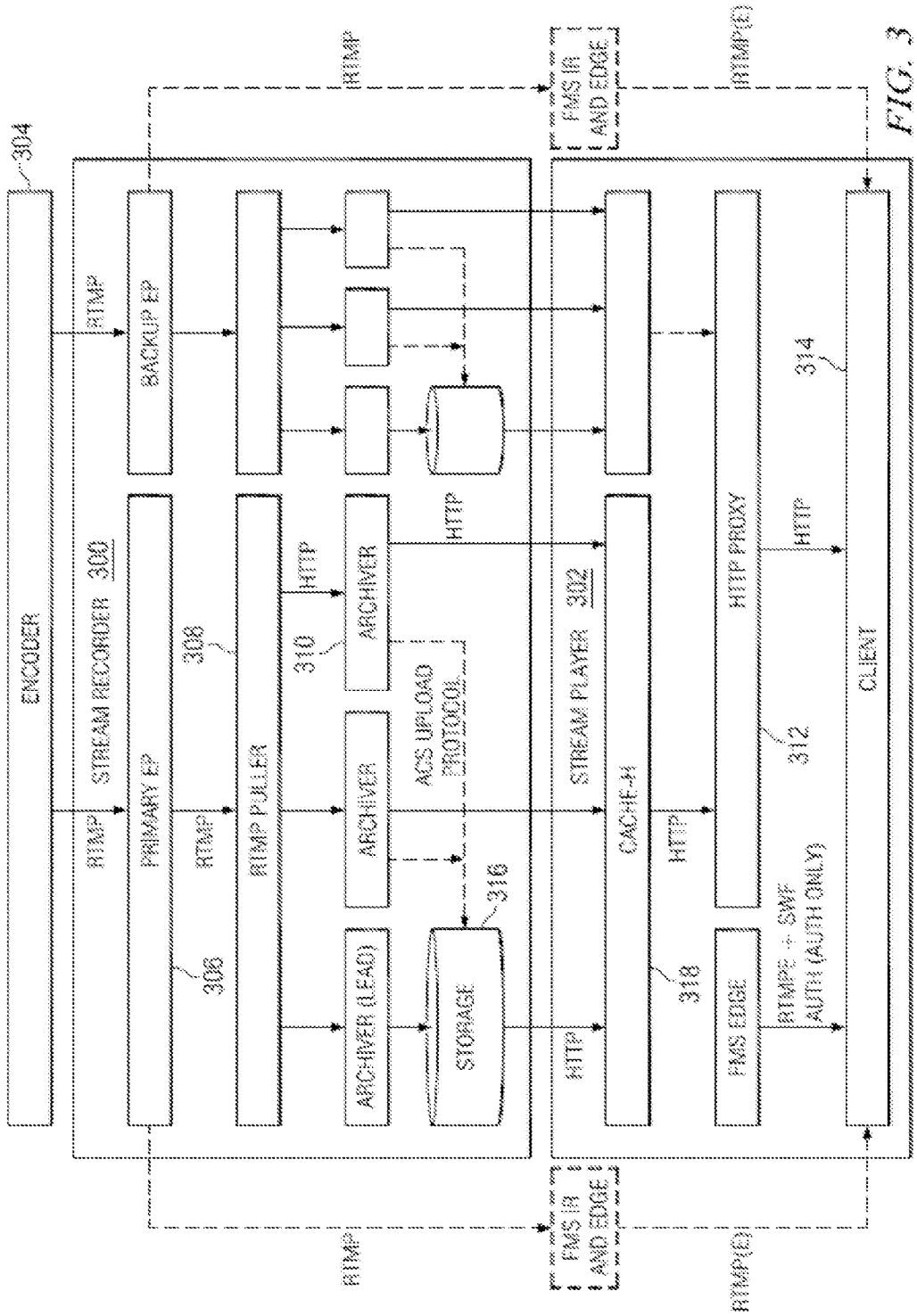
FIG. 3 is a schematic diagram of a network for HTTP-based delivery of high definition (HD) video to clients across both fixed line and mobile environments according to the teachings of this disclosure.
Figure 4:
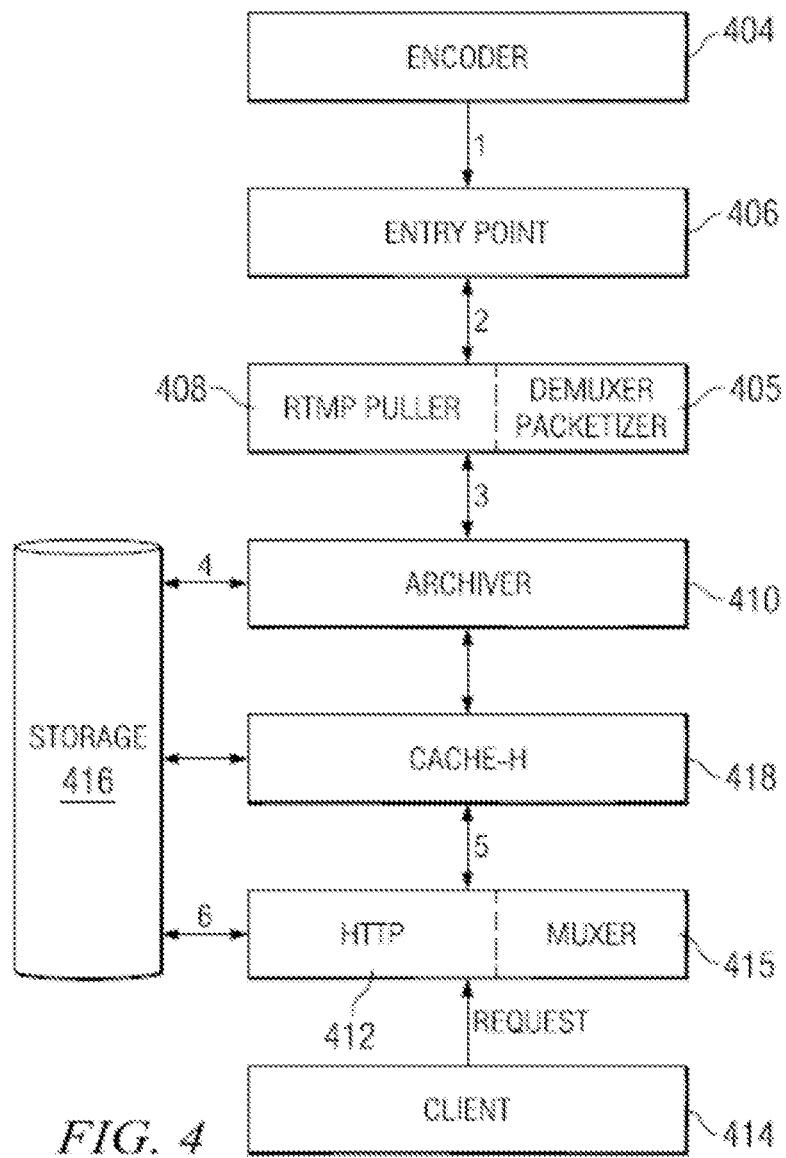
FIG. 4 shows the network of FIG. 3 in additional detail.

FIG. 3 illustrates an overview of a preferred architecture for live streaming delivery. A simplified version of this architecture is shown in FIG. 4. As can be seen in FIG. 3, the system generally is divided into two independent tiers: a stream recording tier 300, and a stream player tier 302. As will be described in more detail below, the recording process (provided by the stream recording tier 300) is initiated from the Encoder 304 forward. Preferably, streams are recorded even if there are currently no viewers (because there may be DVR requests later). The playback process (provided by the stream player tier 302) plays a given stream starting at a given time. Thus, a "live stream," in effect, is equivalent to a "DVR stream" with a start time of "now."

Referring to FIG. 3, the live streaming process begins with a stream delivered from an Encoder 304 to an Entry Point 306. An RTMP Puller component 308 (e.g., running on a Linux-based machine) in an EP Region (not shown) is instructed to subscribe to the stream on the EP 306 and to push the resulting data to one or more Archiver 310 processes, preferably running on other machines. As illustrated, one of the Archivers 310 may operate as the "leader" as a result of executing a leader election protocol across the archiving processes. Preferably, the Archivers 310 act as origin servers for the edge server HTTP proxy processes (one of which is shown at 312) for live or near-live requests. The edge server HTTP proxy 312 provides HTTP delivery to requesting end user clients, one of which is the Client 314. A "Client" is a device that includes appropriate hardware and software to connect to the Internet, that speaks at least HTTP, and that includes a content rendering engine. The Client device type will vary depending on whether the device connects to the Internet over a fixed line environment or a mobile environment. A representative client is a computer that includes a browser, typically with native or plug-in support for media players, codecs, and the like. If DVR is enabled, content preferably is also uploaded to the Storage subsystem 316, so that the Storage subsystem serves as the origin for DVR requests as will be described.

As also seen in FIG. 3, the content provider may choose to deliver two copies of the stream, a primary copy, and a backup copy, to allow the stream to continue with minimal interruption in the event of network or other problems. Preferably, the primary and backup streams are treated as independent throughout the system up through the edge server HTTP proxy, which preferably has the capability of failing over from the primary to the backup when the primary is having difficulties, and vice versa.

In this embodiment, a content request (from an end user Client 314) is directed to the CDN edge machine HTTP proxy 312, preferably using techniques such as described in U.S. Pat. Nos. 6,108,703, 7,240,100, 7,293,093 and others, the disclosures of which are hereby incorporated by reference. (Note that in other embodiments an HTTP proxy associated with other CDN machines, such as a CDN machine located in a centralized location, may be employed.) When an HTTP proxy 312 receives an HTTP request for a given stream, the HTTP proxy 312 makes various requests, preferably driven by HTTP proxy metadata (as described in U.S. Pat. Nos. 7,240,100, 7,111,057 the disclosures of which are hereby incorporated by reference, and others), possibly via a cache hierarchy 318 (see, e.g., U.S. Pat. No. 7,376,716, the disclosure of which is hereby incorporated by reference, and others) to learn about and download a stream to serve to the Client 314. Preferably, the streaming-specific knowledge is handled by the edge machine HTTP proxy 312 directly connected to a Client 314. Any go-forward (cache miss) requests (issued from the HTTP proxy) preferably are standard HTTP requests. In one embodiment, the content is delivered to the Client 314 from the HTTP proxy 312 as a progressive-download FLV file. As noted above, the references herein to Adobe FLV are used herein by way of example, as the disclosed architecture is not limited for use with Adobe FLV. For secure streams, preferably the Client 314 first authenticates to the HTTP proxy 312 using an edge server authentication technique and/or a SWF-verification back-channel.

When a Client 314 requests a particular stream, the HTTP proxy 312 (to which the client has been directed, typically via DNS) starts the streaming process by retrieving a "Stream Manifest" that contains preferably only slowly changing attributes of the stream and information needed by the HTTP proxy to track down the actual stream content. The URL to download this manifest preferably is constructed deterministically from metadata delivered (e.g., via the distributed data transport mechanism of FIG. 1) to the HTTP proxy. Preferably, the manifest itself is stored in association with a Stream Manifest Manager system (not shown) and/or in the storage subsystem 316. Preferably, a Stream Manifest describes the various "tracks" that compose a stream, where preferably each track constitutes a different combination of bit rate and type, where type is "audio," "video," or "interleaved_AV." The Stream Manifest preferably includes a sequence of "indexInfo" time ranges for each track that describe forward URL templates, stream properties, and various other parameters necessary for the HTTP proxy to request content for that time range.

For "live" requests, the HTTP proxy starts requesting content relative to "now," which, in general, is approximately equal to the time on the edge machine HTTP proxy process. Given a seek time, the HTTP proxy downloads a "Fragment Index" whose name preferably is computed based on information in the indexInfo range and an epoch seek time. Preferably, a Fragment Index covers a given time period (e.g., every few minutes). By consulting the Fragment Index, an "Intermediate Format (IF) Fragment" number and an offset into that fragment are obtained. The HTTP proxy can then begin downloading the file (e.g., via the cache hierarchy 318, or from elsewhere within the CDN infrastructure), skipping data before the specified offset, and then begin serving (to the requesting Client) from there. Preferably, the IF fragments are sized for optimal caching by the HTTP proxy. In general, and unless the Stream Manifest indicates otherwise with a new indexInfo range, for live streaming the HTTP proxy then continues serving data from consecutively-numbered IF Fragments.

As used herein, and in the context of live HTTP-based delivery, the Intermediate Format (IF) describes an internal representation of a stream used to get data from the RTMP Puller through to the edge machine HTTP proxy. A "source" format (SF) is a format in which the Entry Point 306 provides content and a "target" format (TF) is a format in which edge machine HTTP proxy 312 delivers data to the Client 314. According to this disclosure, these formats need not be the same. Thus, SF may differ from TF such that a stream may be acquired in FLV format and served in a dynamic or adaptive (variable bit rate) format. The format is the container used to convey the stream; typically, the actual raw audio and video chunks are considered opaque data, although transcoding between different codecs may be implemented as well. By passing the formats through the HTTP proxy (and delivering to the Client via conventional HTTP), the container used to deliver the content can be changed as long as the underlying codecs are managed appropriately.

Referring now to FIG. 4, in one embodiment the HTTP streaming architecture for live content may work as follows. At step 1, a content provider's encoder 404 pushes a live FLV stream to Entry Point (EP) 406. At step 2, the RTMP Puller 408 pulls the stream from the EP 406 and breaks it up into Intermediate Format (IF) file fragments and corresponding index information. A Demuxer process 405 facilitates this operation. The Puller 408 preferably uses metadata from a Stream Manifest file to determine how large to make each individual IF fragment. Preferably, and as noted above, IF fragment size is optimized for caching in the cache associated with an edge machine HTTP proxy.

At step 3, the Archiver 410 retrieves from the Puller 408 the IF fragments along with their corresponding index information. The Archiver 410 appends the index information for each IF fragment to the current Fragment Index (FI) file. Preferably, the Archiver 410 caches a predetermined number of IF fragments for live play-back.

As the fragments age out, preferably they are deleted from the Archiver 410 and, at step 4, they are archived, e.g., to the Storage subsystem 416. Thus, at set intervals (e.g., every few minutes), the Archiver 410 closes the current FI file, archives it to the Storage subsystem 416, and begins creating a new FI file.

At step 5, and after an end user Client 414 has been associated with a particular edge machine, the HTTP proxy 412 in that machine gets the fragments for live play-back and limited DVR time periods from the Archiver 410 (possibly via the cache-hierarchy 418). Fragments no longer available on the Archiver 410 are retrieved from the Storage subsystem 416. A Muxer process 415 that operates in association with the HTTP proxy 412 facilitates this operation. Preferably, each IF fragment is a separate object for the HTTP proxy 412 that can be and in this embodiment is accessed through HTTP. In other words, according to this disclosure, the live stream is broken up into many small objects/fragments. The HTTP proxy 412 receives DVR commands from the Client player, typically on a separate HTTP connection. When the player requests to begin playing from a new stream position, the HTTP proxy uses metadata from the Stream Manifest file to calculate which FI file contains the target time offset. The FI file is retrieved from the Archiver 410 or the storage sub-system 416 (or, alternatively, from a peer machine co-located with the edge machine) and contains the IF fragment and byte offset to begin streaming to the Client player.

Figure 5:
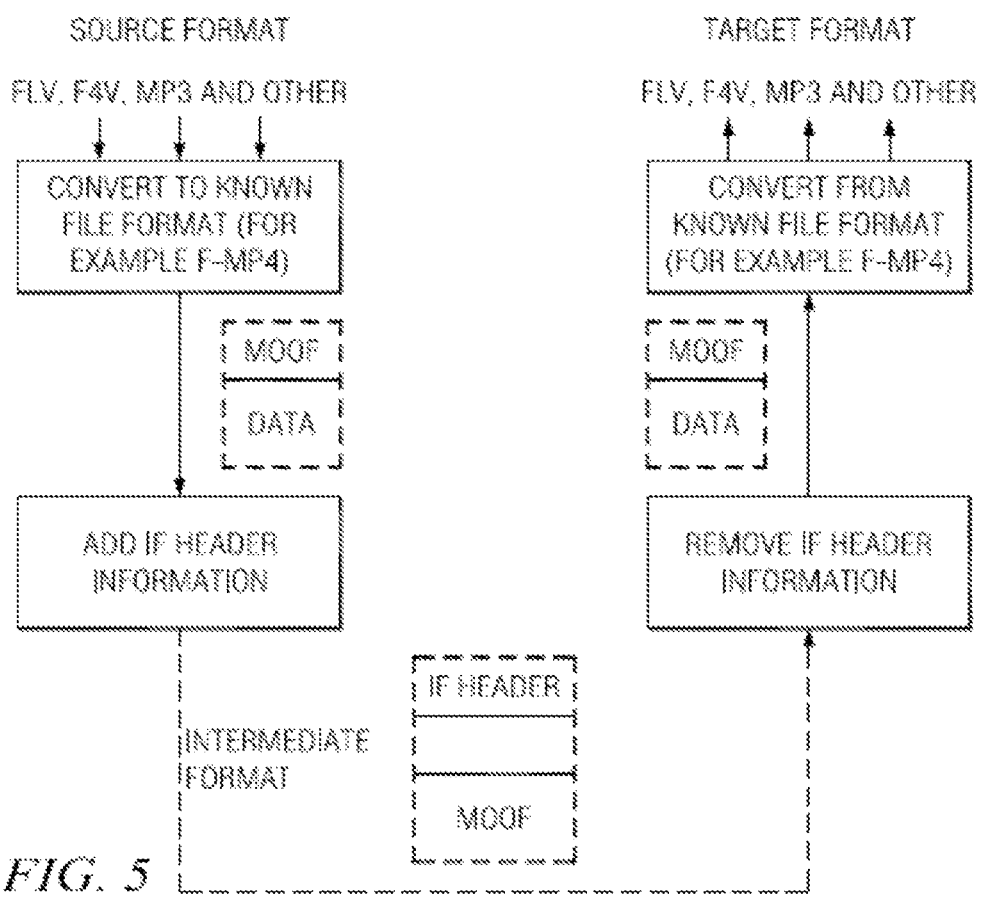
FIG. 5 illustrates a representative packet flow across the network of FIG. 3 from a source format (SF) to a target format (TF) using the Intermediate Fragments (IF) according to the disclosed technique.

FIG. 5 illustrates a representative packet flow from source format (SF) to target format (TF), although the conversion processes may be omitted (in other words, source format bits may be placed in the IF Fragment without additional format conversion). As noted above, preferably each video stream is broken into Fragments. Fragments are numbered consecutively starting at some arbitrary point (which can be determined by consulting the Fragment Index). The sequence may be discontinuous across Stream Manifest indexInfo ranges. Each Fragment preferably comprises header information describing the type of data enclosed. Following these headers are the IF payload, such as a sequence of FLV tags. A target format may also be just an encrypted form (such as based on AES 128) of the elemental audio/video streams.

The Fragment Indexes enable the HTTP proxy process (to which a particular Client has been associated) to find a frame around a desired "seek time." Preferably, each Fragment Index file contains index information covering a fixed amount of time. The exact interval is stored in the Stream Manifest for each indexInfo range. The desired seek time (epoch time) can be rounded down to the nearest interval boundary to find the Fragment Index to request.

Preferably, each stream is represented completely by the Stream Manifest, the Fragment Index and the IF Fragments. In an illustrative embodiment, the Stream Manifest is an XML file that contains the following information: stream epoch time (this time may be the time when the stream started or may be the oldest archived portion of the stream still available); stream Properties (like bit rate, video size, codec information, etc.); information about fragment indexes and which URL pattern to use to request FI file; and URL pattern for the fragments. The Fragment Index (FI) typically comprises the following: information about which key frame to start streaming from for a given time slice; key frame-to-fragment number mapping, key frame-to-time mapping, key frame to byte-offset in that fragment mapping, and so forth. Each IF Fragment contains approximately N seconds of stream, preferably optimized for HTTP proxy caching and not necessarily fragmented on time boundaries.

Each fragment is composed of a fragment header, fragment stream header and a payload, and each fragment is uniquely identified by the fragment number. Fragment numbers incrementally increase.

Typically, and with reference back to FIG. 4, the Archiver 410 has the fragments for the most recent N minutes of the stream, and the rest of the fragments are on the Storage subsystem 416. The Archiver creates a stream manifest XML file for each stream. It puts all the necessary information that an HTTP proxy can use to make fragment and fragment index requests. For the Archiver to construct a Stream Manifest, preferably RTMP Puller sends the stream properties downstream. Preferably, the IF Fragment is used to serve time-related data, i.e. actual video/audio bytes. Also, preferably the HTTP proxy (to which the Client has been associated) makes requests for IF Fragments only. Thus, it is desirable to isolate fragments from packets that have stream properties.

The Muxer subsystem 415 associated with (or within) the HTTP proxy determines how to request IF, converts IF to the output stream, and passes this data to the HTTP proxy for serving to the requesting client. In addition, preferably the HTTP proxy process supports a control channel by which the client can make any combination of various requests against an active stream including, without limitation, sessionToken, seek, and switch. The control channel facilitates flow control when working in some runtime environments, such as where the client lacks its own flow control facilities. In this situation, the control channel passes throttle commands that may be based on a percentage of an average bit rate (over the server-to-client connection) to help maintain full a target buffer on the client side of the connection. A sessionToken request is a request to provide additional authentication information, e.g., via SWF Authentication. A "seek" is a request to start sending data as of a different time in the stream (including "jump to live"). A "switch" is a request to start sending data from a different track from the same Stream Manifest. This might be a bit rate switch and/or an angle change.

Thus, the HTTP proxy receives DVR commands from the client player, preferably on a separate HTTP connection. When the client player requests that playback begin from a new stream position, the HTTP proxy uses metadata from the Stream Manifest file to calculate which FI file contains the target time offset. The FI file is retrieved (e.g., from the Archiver or the Storage subsystem, or from a peer machine) and contains the IF fragment and byte offset to begin streaming to the client player.

As described, the Stream Manifest preferably is an XML file and contains information about fragment indexes and how to construct the URL for an FI file, how to construct the URL for the "now" request, and how to construct the URL for the fragments. The HTTP proxy caches the manifest, which can be retrieved to the proxy either from an Archiver (which may be tried first), or the Storage subsystem. Client players connect to the HTTP proxy to play the live stream (i.e., connect to the stream's "now" time). In response, the HTTP proxy makes a forward request to the Archiver to fetch the "now" time on a live stream. Metadata in the Stream Manifest is used by the HTTP proxy to create the "now" URL.

As also described, a stream has a number of FI files. Each contains stream keyframe information for a given time slice. The Fragment Index allows time offsets to be mapped to fragment numbers and byte offsets. The Stream Manifest file defines the time slice for each FI file.

Each IF Fragment contains approximately N seconds of a stream. Each fragment is composed of a header and a payload. The HTTP proxy understands the data in the header, but the payload is opaque. The HTTP proxy links together with a Muxer component to convert the IF-formatted payload to the target format that is streamed to the client player. The fragments are cached in the HTTP proxy for re-use, and each fragment is identified with its stream name and an integer suffix that increases incrementally. As described above, Archiver has the fragments for the most recent N minutes of the stream, and the rest of the fragments are on the Storage subsystem.

For non-authenticated content, preferably the client player connects to an http: //URL to play a stream. Query string parameters can be used to request a particular seek time if the default (live if the stream is live, or the beginning of the stream if it is not live) is not appropriate. For authenticated content, preferably the original http: //URL additionally contains a shared authentication token query string parameter generated by the customer origin. This enables the HTTP proxy process to serve the stream for some configured amount of time (e.g. a given number of seconds). After that time, the HTTP proxy process terminates the connection unless, for example, an out-of-band control POST is received with a signed "session token." Although not meant to be limiting, in one approach this token preferably is generated by the client by connecting to an FMS (or equivalent) edge machine that can perform SWF Verification (as shown in FIG. 3). The machine returns the signed session token to the client to be forwarded back to the HTTP proxy process as a control channel POST. Once the session token is received by the HTTP proxy, the stream preferably will play indefinitely. Other types of stream authentication may be implemented as well.

Figure 6:
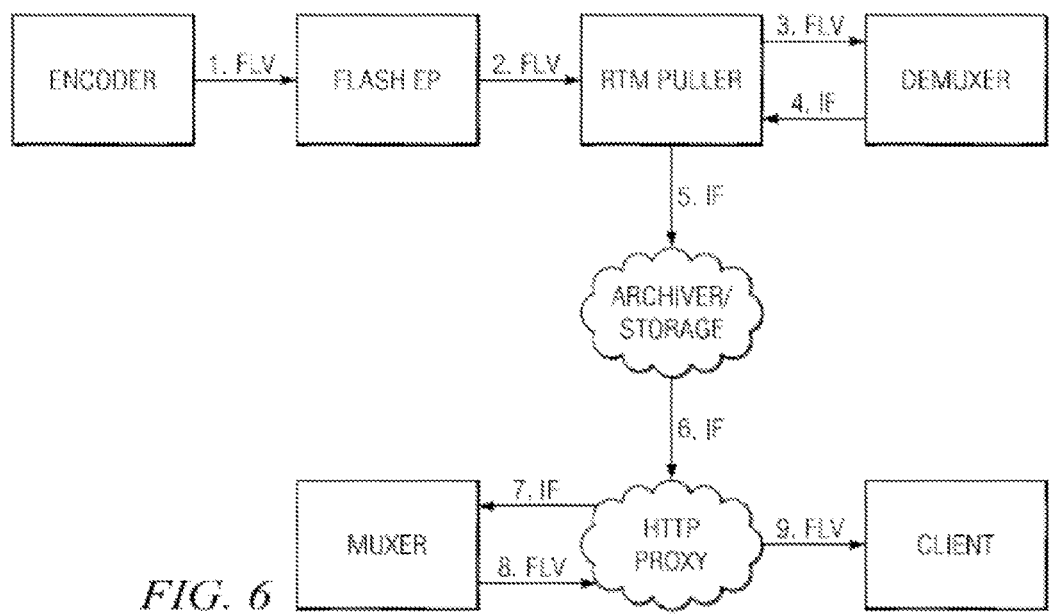
FIG. 6 illustrates another view of the flow of media packets into and out of the streaming server framework.

FIG. 6 is another view of the flow of the media packets into and out of the streaming server framework of this disclosure for live streaming. As noted above, the framework processes (demuxes) the incoming media packets into an intermediate format (IF). In particular, the Encoder pushes the CDN customer content into an Entry Point. The Puller then pulls the content from the EP and passes the data to its associated Demuxer, which converts the incoming source format (SF, such as FLV) to IF fragments before injecting them into the Archiver network. An Archiver receives data from the RTMP Puller and incrementally writes this data to memory, such as a RAM disk (or other data store). If the HTTP proxy (to which a Client has been associated) requests a Fragment or Fragment Index that is currently in the process of being received from the Puller, the Archiver sends the response (preferably in a chunk-encoded HTTP response) so that the data can be sent as soon as it is received. Once a Fragment or Fragment Index is complete, a designated leader Archiver (selected via a leader election process) attempts to upload the resulting file to the Storage subsystem. As noted above, the muxer component associated with the edge region/server processes (muxes) the packets to the desired target format (TF) before the packets reach the end clients.

A Demuxer process may be integral to the Puller; likewise, a Muxer process may be integral to the HTTP proxy process. There may be one Demuxer process for multiple Pullers; there may be one Muxer process for multiple HTTP proxies (within a particular Region).

As noted above, in terms of functionality, Demuxer converts regular stream packets into IF fragments and Muxer does the opposite. By definition, Demuxer and Muxer should complement each other. As noted, Demuxer can be part of an RTMP Puller process or can be a separate process running on the RTMP Puller machine. Demuxer receives input via the RTMP Puller. It is responsible to do the following: generate IF Fragment Header, take the source format and package the same into IF body, add Fragment Stream Header, Push IF fragment to Archiver, analyze the fragment and generate index information pertinent to key frame location within a given FLV packet, Push Key frame information to the Archiver. This can be done synchronously/asynchronously with respect to the IF fragment transmission. Preferably, Demuxer also is responsible for determining an optimal size of the fragment, which fragment size should be optimal for HTTP proxy caching. Demuxer can base its decision (regarding the optimal size of the fragment) by examining the following stream properties: incoming live stream byte rate/bit rate; Key Frame Interval, or a combination of both. Apart from constructing IF Fragments, Demuxer is also responsible to push Stream Properties and key frame information to the Archiver. Archiver can then create the Stream Manifest file that will be used by the HTTP proxy/Muxer to make fragment index and individual fragment requests. As described above, Muxer complements Demuxer. As Demuxer is responsible for constructing IF Fragments, Muxer is responsible for deconstructing the IF Fragments and converting the IF Payload format to the target format (TF) that the Client requested. The Muxer may also provide the following information to the HTTP proxy: statistics information about HTTP delivered Streams; and client session playback Information, such as playback duration, etc., and Muxer health data.

The Demuxer and Muxer enable dynamic transmux output to other file formats. This enables the system to leverage a single set of content sources for different device capabilities, e.g., iPhone 3.0 streaming using MPEG-2 TS Segments, Microsoft Silverlight 3 (with H.264 playback), Shoutcast®, and so forth.

As a variant to the above-described "pull" model that operates between an Encoder and an Archiver, it is also possible to use a "push-based" approach.

3.0 Video on Demand (VOD) Delivery

The above-described architecture is useful for live streaming, particularly over formats such as Flash. The following section describes adding video on demand (VOD) support to the platform. In particular, the solution described below provides VOD streaming from customer and Storage subsystem-based origins, provides single and multiple bitrate (SBR and MBR) streaming, provides support for origin content stored in flv and mp4/flv containers (supported mp4/flv codes include, among others, AAC, MP3, PCM for audio, and H.264 for video), and minimizes download of content beyond what is directly requested by the end user.

For VOD delivery, the stream recorder tier 300 (of FIG. 3) is replaced, preferably, with a translation tier, as will be described. For VOD delivery using HTTP, the Fragment Indexes may be generated from the origin content on-the-fly (e.g., by scanning FLV or parsing MP4 MOOV atoms) and caching these indexes. Actual data retrievals may then be implemented as "partial object caching" (POC) retrievals directly from source material at the edge region or via an intermediate translation (e.g., by a cache-h parent) into an Intermediate Format. As used herein, partial object caching refers to the ability of an HTTP proxy to fetch a content object in fragments only as needed rather than downloading the entire content object. The HTTP proxy can cache these fragments for future use rather than having to release them after being served from the proxy. An origin server from which the content object fragments are retrieved in this manner must support the use of HTTP Range requests.

Before describing a VOD implementation in detail, the following section describes several ways in which VOD content is off-loaded for HTTP delivery to the CDN. In a first embodiment, a conversion tool (a script) is used to convert source content flv to IF, with the resulting IF files then uploaded to the Storage subsystem. In this approach, metadata is used to have an HTTP proxy go forward to the Storage subsystem to retrieve the stream manifest, which then references the Storage subsystem for the remaining content. In this approach, files in mp4/flv are first converted to flv (e.g., using ffmpeg copy mode) to change the container to flv. Another approach is to have a CDN customer upload raw media files to the Storage subsystem and to run a conversion tool there. Yet another alternative is to have the customer (or encoder) produce content in IF directly.

The translation tier approach is now described. In this approach, an on-demand dynamic IF generator machine takes requests for IF (manifests, indexes, and fragments) and satisfies these requests by dynamically retrieving flv or mp4/f4v input file ranges (either from the Storage subsystem or customer origin). From there, HTTP proxy treatment is essentially the same as the "conversion tool" options described above. The generator machine preferably runs its own HTTP proxy (the "translator HTTP proxy") to cache various inputs and outputs, together with a translator process (described below) that accepts requests (e.g., from a localhost connection to the translator HTTP proxy) and generates IF based on data retrieved from the HTTP proxy via an associated cache process. In an alternative, the translator process may comprise part of the translator HTTP proxy, in which case IF generation takes place within the proxy. Fragment generation may also be carried out in an edge machine HTTP proxy or even further downstream (into the Client itself), such as where a Client maintains a session connection with one or more peer clients.

Figure 7:
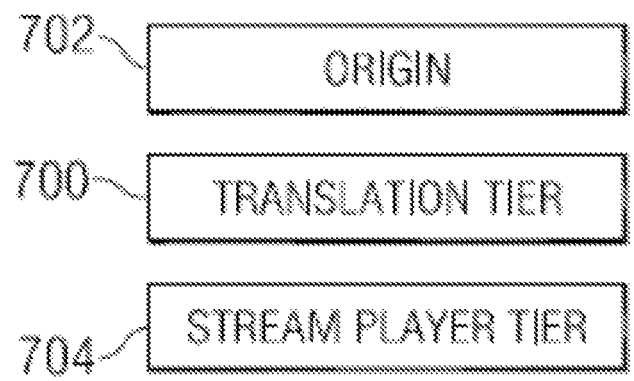
FIG. 7 illustrates how the network for HTTP-based delivery is used to provide video on demand (VOD) stream delivery.

An architecture and request flow of a preferred approach is shown in FIG. 7. In this embodiment, which is merely representative and non-limiting, a translation tier 700 is located between an origin 702 (e.g., customer origin, or the Storage subsystem, or both) and the stream player tier 704. In a representative embodiment, the translation tier executes in its own portion (e.g., a Microsoft IIS or equivalent network) within the CDN, preferably in a Region dedicated to this purpose. Alternatively, a translator (as described below) may run on a subset of HTTP-based edge machine Regions.

Figure 8:
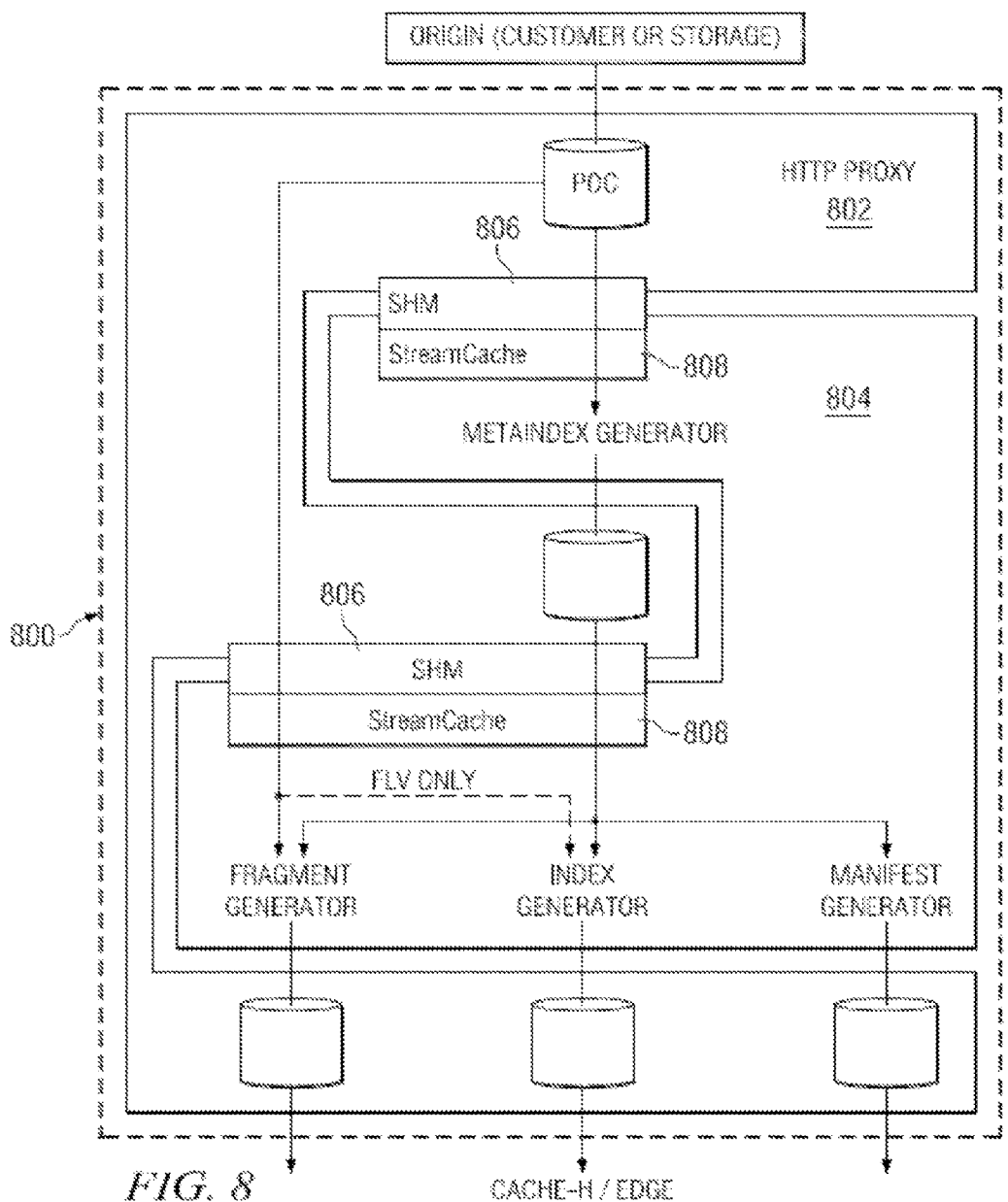
FIG. 8 illustrates a representative translation machine configuration of the VOD portion of the HTTP-based delivery network.

FIG. 8 illustrates a representative translator machine 800. This machine, like the machine shown in FIG. 2, includes CPU, memory, disk store and network interfaces to provide an Internet-accessible machine. In addition, as shown in FIG. 8, in this embodiment, the two main components of the translator machine comprise the HTTP proxy 802, and a translator process 804. The HTTP proxy 802 performs partial object caching (POC) and interacts with the translator process 804, which generates the stream manifest, index and fragments. The proxy and translator components interface to one another via shared memory 806 and a stream cache process 808, described in more detail below. The operation of the translation machine is best provided by way of an example. The following section describes the request flow from client to origin for a single bit rate (SBR) stream request, and how the components described above facilitate this process. Example URLs are provided.

As used below, "C" refers to the Client, "EG" refers to an edge machine HTTP proxy, "TG" refers to a translator machine HTTP proxy (such as proxy 802 in FIG. 8), "T" refers to the translator process (such as process 804 in FIG. 8), and "O" refers to origin (which may be a customer origin or the CDN Storage subsystem).

C→EG: The process begins when a Client makes a request to the edge machine HTTP proxy for the desired content. A representative URL might be as follows:
http://efvod.customer.com.akamaihd.net/foo/bar/baz.mp4

EG→itself: The EG HTTP proxy then matches on the request pattern, and sets a number of parameters, such as "event," "angle," "bitrate," and "streamed." The actual pathname is the "event," and the "streamid" identifies a customer configuration associated with the request.

EG→TG: The EG HTTP proxy then goes forward to retrieve the Stream Manifest from a translator machine; preferably, the HTTP proxy goes forward by providing a metadata-configured hostname (to the CDN DNS) that resolves to addresses associated with the translator machines. Preferably, the request path is prefixed with a customer identifier and protected by a per-customer secret, e.g., based on an authentication mechanism that operates between HTTP proxies. A representative URL might be as follows:
http://translator.customer.com.akamaihd.net/custid1/translate/fo o/bar/baz.mp4?object=manifest TG→T: If the translator HTTP proxy has already produced the Stream Manifest (or can find it, e.g., via ICP), the Manifest is returned to the edge HTTP proxy that requested it. Otherwise, the translator HTTP proxy itself goes forward to localhost to retrieve the manifest. Preferably, the customer identifier prefix is preserved. The translator HTTP proxy may also apply one or more host headers on the manifest request (to the translator process) that are then echoed back to the translator HTTP proxy in any requests for origin content, metaindexes, etc. Preferably, all TG↔T interactions carry these same headers. These headers ensure that the translator HTTP proxy is only fulfilling requests for the proper customer, and also to facilitate load balancing. The translator requests may also be authenticated using a cookie and a per-customer secret. A representative URL might be as follows:
http://translator.customer.com.akamaihd.net/custid1/translate/fo o/bar/baz.mp4?object=manifest
Forward IP/port: 127.0.0.1:yyyy T→TG: The translator in turn retrieves the "metaindex" for the stream from the translator HTTP proxy using the stream cache process and the cookie. (To produce a manifest, typically only the beginning of the metaindex is retrieved.) The translator applies the customer-specific secret (from the original request) to the metaindex request back to the HTTP proxy. With the information in the "metaindex," the translator produces the Stream Manifest. A representative URL is as follows:
http://translator.customer.com.akamaihd.net/custid1/metaindex/fo o/bar/baz.mp4&format=mp4
Forward IP/port: 127.0.0.1:80

TG→T: If the translator HTTP proxy does not have the metaindex already cached, it again goes forward to the translator (same procedure as for the Manifest). A representative URL is as follows:
http://translator.customer.com.akamaihd.net/custid1/metaindex/fo o/bar/baz.mp4&format=mp4
Forward IP/port: 127.0.0.1:yyyy T→TG: When the translator receives the request for the metaindex, it retrieves (via the stream cache process using same procedure as above for the Manifest) a small subset of the original content, which the translator HTTP proxy is able to retrieve from origin, preferably using partial object caching (POC). For flv files, preferably only the very beginning and the last block will be read. For mp4/f4v files, preferably the "moov" atom at the beginning of the file is processed in its entirety. A customer-specific prefix and secret preferably are passed along this entire path. A representative URL is as follows:
http://translator.customer.com.akamaihd.net/custid1/origin/foo/b ar/baz.mp4
Forward IP/port: 127.0.0.1:80

TG→O: The translator HTTP proxy ultimately goes forward to the appropriate origin on POC misses. A representative URL is as follows:
http://some.origin.com/some/customer/prefix/foo/bar/baz.mp4

EG→TG→ . . . →O: At this point, the edge machine HTTP proxy has a manifest and needs an index. The edge machine HTTP proxy again goes forward to the translator for the index. The process proceeds in essentially the same way as for the Manifest. For "mp4/f4v" files, preferably all indexes are pre-computed and stored verbatim in the metaindex so that no mp4/f4v content access is required. This is not a requirement, however. For "flv" files, producing full index information typically requires reading the entire file; thus, for this type of content, preferably small indexes (e.g., each a few seconds) are generated, e.g., using a binary search over the flv content and then downloading only that window of content. The forward request from the HTTP proxy (as specified in the Stream Manifest) may be as follows:
http://translator.customer.com.akamaihd.net/custid1/translate/fo o/bar/baz.mp4?object=index&number=1234&etag=3-1234567890ab
Additional query-string parameters may be passed from the manifest back to the index or fragment requests to ensure consistency between any parameters that might have changed between manifest generation and index/fragment retrieval.

EG→TG→ . . . →O: The final type of request is for the actual fragment. For mp4/f4v files, the metaindex includes instructions sufficient to produce any requested IF fragment without reparsing or otherwise consulting the original "moov" atom. Preferably, the actual raw data is retrieved via POC and/or the stream cache process and assembled into valid IF fragments. For flv files, the fragment is generated by seeking directly to "desired_fragment_size * (fragment_number-1)" and then scanning forward for the first valid flv tag. The end of the fragment is just the first tag boundary at or after file offset "desired_fragment_size * (fragment_number)". A representative URL is as follows:
http://translator.customer.com.akamaihd.net/custid1/translate/foo/bar/
baz.mp4?object=fragment&number=1234&etag=3-1234567890ab This completes the description of the client to origin request flow for an SBR stream request. The following provides additional details regarding the VOD implementation.

The metaindex is a binary format preferably comprising several sections, preferably in the following order: (i) fixed-size global header with per-stream information; (ii) additional "content-verifier" information, e.g., ETags, used to identify which file has been indexed; (iii) an "on MetaData" tag for the stream; (iv) per-track information, including flv codec identifier and optional codec configuration parameters required by AAC and H.264; (v) (mp4/f4v only) Lookup table to map fragment numbers to "sample_info" below; (vi) (mp4/f4v only) IF Indexes; (vii) (mp4/f4v only) "sample_info" which describes each individual sample to be interleaved into the output. The "sample_info" essentially is an optimized version of the "moov" atom that abstracts out many of the complexities of the mpeg-4 container. In general, this should be a fairly compact representation, often smaller than the corresponding "moov" atom.

A Stream Manifest may include all bitrates of a multi-bit rate (MBR) stream. To produce an MBR Stream Manifest, the manifest request may reference an SMIL file, which in turn contains the individual bitrates and flv or mp4/f4v source files. For MBR delivery, to produce the actual manifest the translator downloads metaindexes for each bitrate. The index and fragment requests only require the metaindex file for the particular bitrate(s) that the edge machine HTTP proxy wants to play. MBR fragment and index requests are similar to their SBR counterparts, except they also include an "smil= . . . " query-string argument added to each path in the C→EG→TG→T chain via patterns in a <locationInfo> tag in the manifest.

Preferably, the actual format ("mp4" vs. "flv") is included in metaindex, fragment, and index URLs as a "format" query string argument.

As noted above, IF generation can take place within or in association with the HTTP proxy, including even an edge machine. This enables the creation of content at the edge itself, close to the requesting end user. Indeed, this approach (of IF generation in or in association with the HTTP proxy) can move even further downstream, namely, into the client machine itself. This is possible if the client includes software that facilitates peer-based network session connectivity to a peer-to-peer (P2P) network, at least some portion of which is based on CDN resources including edge machines running HTTP proxies. As noted above, it is possible the IF is generated in an HTTP proxy (or in a Muxer process associated therewith). When such P2P network session software executes within a Client, it is possible to extend the HTTP proxy interface all the way downstream to the Client machine itself. In this approach, muxing takes place in the Client itself, in which case the edge machine becomes just a "parent" cache in a cache-hierarchy that includes the client-side delivery mechanism. This approach could also be used with mobile devices with limited bandwidth.

4.0 Additional Details for Live Streaming and VOD Delivery

The techniques described herein facilitate the delivery of high definition video and audio (including advanced video features, such as DVR) over an HTTP-edge network which, in a typical CDN, is the network that has the largest footprint. By implementing such techniques, a provider can leverage its existing HTTP-based servers instead of having to implement and maintain dedicated server networks to support multiple third party runtime environments. Moreover, because the delivery is HTTP-based, the content can be seamlessly delivered to clients operating across fixed line and mobile environments. No special client software is required, as the HTTP proxy (that responds to the client request) dynamically re-assembles fragments that it obtains and serves the requested content via HTTP. Further, because delivery within the set of interconnected machines of the CDN preferably takes advantage of an intermediate format, the network can ingest content in one format yet serve it in another, all while preserving single or multi-bitrates and DVR-like functionality. Thus, for example, the network may take in live RTMP packets and serve the content as an FLV progressive download. Preferably, each IF fragment of the stream is a separate object for the HTTP proxy that can be accessed, cached, and served via HTTP. According to the scheme, the stream is broken up into many small objects (fragments), with each fragment managed separately.

The network is not limited for use with any particular runtime environment such as Flash. By leveraging the approach as described, a single set of content sources can be leveraged for different device capabilities. Thus, the techniques as described herein include dynamically transmuxing content to other file formats in a manner that is transparent to the content provider and the end user.

The intermediate format may be based on or adapted from any convenient multimedia file format that can be used delivery and playback of multimedia content. These include, without limitation, fragmented mp4, protected interoperable file format (piff), and others. More generally, any linked list-based file format may be used.

Preferably, the CDN service provider provides an extranet (a web-based portal) through which the stream delivery is provisioned.

5.0 Alternative Security Techniques

The following section provides an alternative to the RTMPE and SWF file authentication technique referenced above. Three security areas are considered, as relevant to an HTTP proxy (or otherwise): user authorization, player verification, and stream encryption.

5.1 User Authorization

User authorization involves, for example, ensuring that a user has permission to play a stream of content. In one implementation, an HTTP proxy, such as HTTP proxy 312 described above in connection with FIG. 3, can implement URL-based features to authorize users at the network edge. In one embodiment, authorization logic can be written inside a client player by customers of a CDN providing the HTTP proxy, or by others. Before sending a 'play' request to the HTTP proxy for an authorized user, the client player generates a primary token for the URL to be played using a pre-shared secret with the HTTP proxy. The primary token is added to the URL as a query string parameter. The token is valid for a short period of time (on the order of seconds, in some implementations), to make sharing the URL difficult.

The use of such URL-based authorization can be signaled by setting the stream-ID in the URL to be played (e.g., by setting a value or a prefix thereof). The user authorization is preferably done before any streaming code/functionality is executed, for example before the stream manifest is fetched. Representative metadata to implement such authorization at the edge is provided below. In this case the match function looks for a prefix of "URLauth" to determine that URL-based authorization is used:

```
1.    <match:regex string="%(STREAMID)" regex="^URLauth">
2.      <auth:browser.query.validate>
3.        <salt>[EDGE_AUTH_SALT]</salt>
4.        <param-name>primaryToken</param-name>
5.        <status>on</status>
6.        <fwd-req-on-failure>off</fwd-req-on-failure>
7.      </auth:browser.query.validate>
8.    </match:regex>
```

5.2 Player Verification

Player verification typically involves ensuring that a stream is played from player that is approved by the content provider and unaltered. For the Adobe® Flash® runtime environment, the player would be a SWF player, while for the Silverlight® environment, the player would be a .XAP application, and so on. Though the code is running on an untrusted client device, preferably player verification prevents or hinders the use of modified players, allows for efficient revocation of compromised players, and offers configuration/update of security implementation (e.g., the hash function employed and/or keys) without necessarily updating the player. User authorization and player verification can be used independently. For example, it may be determined that content consisting of ad banners or commercial breaks does not require user authorization but player verification is. In the opposite case, some customers might require user authorization to be able to track registered users for marketing purposes, but not care if a player has been tampered with (e.g., because their stream has a low value).

In one implementation, an HTTP proxy (such as previously described) inserts a challenge and a file inside a content stream. In the Flash environment, the file may be a SWF file.

The stream may carry the file with a filename or without a filename, in the latter case the stream delivering the content of the file. For convenience of description herein the file is referred to as "hash.foo" regardless of whether it is delivered with a filename. As noted, in a Flash environment, the filename extension would be swf.

The file provides a set of instructions that represent a program to be executed by the player. For example, it can define a function that obtains identifying information associated with the player and hashes it (along with the challenge, in some implementations) into a token. It then passes the token to the HTTP proxy. The identifier may represent, for example, the byte array of the player, a unique serial number for the player, an authorization code, a category/class number for the player, a hardware identifier for the client device, and/or other kinds of information. In alternate embodiments, the identifier may correspond to a user of the client player stored on the client device, and thereby be used to indicate that the user is authorized. In some embodiments, for the case of identifiers like a hardware ID or serial number, the user may be required to pre-register with their credentials with the HTTP proxy or another component of the content delivery system, such registration causing the content delivery system to capture the hardware identification for later verification of the user's client device.

The use of a file, such as a SWF file, as described above is not limiting, as the HTTP proxy may deliver programmatic instructions to the client in a variety of formats, such as by delivering byte code, source code, compiled instructions suitable for direct execution by the client machine, or other instruction sets, with or without a filename.

The HTTP proxy typically initiates player verification after the request for content is received. For example, the file may be inserted at the beginning of the stream or during delivery of the stream (e.g. typically within some short time period from the beginning). In alternate embodiments, the file may be delivered out of band, e.g., via another HTTP connection with the HTTP proxy serving the content, an in-region player verification server, or on another machine.

After receiving the token, the HTTP proxy determines whether the player is valid. For example, the HTTP proxy can compute its own token using the same hash function expressed as a string in the dynamic hash language defined below, and compares it with the token sent by the Player. If they match, the stream can continue playing (although it may be subject to a further authorization procedure). Otherwise, the HTTP proxy aborts it. The computation of a corresponding token to verify the player is not a limitation, however, as a wide variety of techniques may be used to determine whether the token and/or the information encoded in it indicates a verified player (e.g., comparing the player identifier to a known list of players provided by a CDN customer, or otherwise).

Typically, the player does not know about the need for verification until it receives the first section of the stream, as the HTTP proxy determines whether to use player verification in most cases. As noted previously, in one embodiment, the HTTP proxy embeds information in the stream for the Player. This information can include a Session-ID, Total Archive Time, and other attributes. If player verification is required, the HTTP proxy inserts the file with program (either the content alone or content with a filename) in as a binary blob under the data parameter.

The file defines a function called which the Player can execute. The implementation of this function preferably is restricted. For example, it could use one or more of a closed set of mathematical encoding algorithms, such as the MD5 hashing algorithm.

Preferably the byte array or other identifying information for the player is obtained programmatically inside the function rather than passed as a function parameter. If the function takes byte arrays as input(s) and output, the byte array returned by the function can be delivered as a base64-encoded string.

If the program/function is present under the data parameter in the stream, the player executes it. The returned string is called the session token. Typically, the player has a short time (e.g., a few seconds) to make an authentication request to the HTTP proxy and pass this token inside the X-cdnsp-Streaming-SessionToken or other HTTP request header. Once the token is sent to the HTTP proxy and the authentication request is made, the player can discard the token if it is not needed.

The HTTP proxy decides whether or not the player verification is required based on the secure flag inside the stream manifest. Preferably, metadata can be used to overwrite this flag at the HTTP proxy, rather than re-publishing the same stream with a different secure flag. Note that the HTTP proxy preferably does not use the stream-ID's prefix to decide if player verification is required. As far as the HTTP proxy is concerned, in this implementation, the stream ID prefix is only used to decide if URL-based authorization is required.

The HTTP proxy can utilize a dynamic hash file to perform the verification process described above. A dynamic hash file is a simple XML file that defines a custom hash function expressed under two equivalent forms: (1) The binary-foo string that holds a base64-encoded file "hash-.foo." This data can be passed by the HTTP proxy to the player in base64-decoded form through the data parameter, as described above. As noted, the player executes the function to yield the session token. (2) the "expression" string in the dynamic hash language, e.g., as set forth below. This string is parsed by the HTTP proxy into a small program that verifies that the session token sent by the player is valid.

Here is a sample dynamic hash file:

```
1.  <?xml version="1.0"?>
2.  <hash-function>
3.    <expression>base64_encode(hmac_sha1("foofoo", $SESSION +
      $PLAYER_MD5))</expression>
4.    <binary type="foo" encoding="base64">....
      base64-encoded hash.foo file .... </binary>
5.  </hash-function>
```

The URL for the hash.foo file (and/or dynamic hash file with hash.foo file contained in it) is set in metadata for the HTTP proxy. Such files can be hosted on storage provided by a CDN, provided by the customer, or otherwise. Metadata can be used to control their time-to-live (TTL) and setup authentication.

In the foregoing implementation, the HTTP proxy uses a database of authorized players. The HTTP proxy gets a list of authorized hash.foo files and/or dynamic hash files by fetching a URL specified in metadata. This URL may be served by an origin server or CDN storage subsystem. The response can contain a directory listing that shows all the SWF or other files allowed (e.g., as designated by a customer of the CDN), as well as a hash of each file, allowed byte arrays or other identifications of the players, as well as a hash of each byte array or identification, and/or other information.

The HTTP proxy may log errors (such as a failure of player verification, or otherwise) and specify the reason for the error or failure. For example, the player verification process may fail because of a verification timeout, the receipt of a bad session token from the player, or a failure on the part of the HTTP proxy to be able to verify the token (e.g., because there is a problem with its list of authorized players).

The HTTP proxy can be configured using metadata to manage player verification process in a variety of ways. For example, the HTTP proxy may be configured to receive certain information from the client player (e.g., the hash.foo file name, or the first few characters of the hash it calculated for the identifier and the challenge) in order to improve the speed of the HTTP proxy in checking the session token from the player against the database of authorized players. Other metadata may configure the timing of the player verification. For example, the HTTP proxy may or may not be configured to wait for player verification to complete before streaming audio/video or other content to the player.

In alternate embodiments, the client identifying information (e.g., player byte array), encoded into a token, can be delivered to the HTTP proxy with the initial request for content. For example, the client player can be configured with library/code support sufficient to enable it to determine its own client identifying information and to encode that information into a token. The token can then be sent to the HTTP proxy for verification along with the initial request for content, as described above (although the request for content and the token may be transmitted over distinct channels).

Further, the ability of the client player to perform some of the client-side verification functionality itself allows the program delivered via the hash.foo file to be eliminated (if client player is self-sufficient) or, preferably, to contain a reduced or incomplete instruction set for verification. The hash.foo file may then supply a necessary piece of the instruction set in order for the client to fulfill the verification process that was described above. For example, the client player may be able to obtain its client identifying information and how to encode that information into a token, but the hash.foo file delivered from the HTTP proxy may specify a secret to be encoded into the token that is returned. As another example, the hash.foo file may specify how to encode the token, by specifying one of set of mathematical algorithms to use, by specifying the calculation itself, or otherwise. Such an approach advantageously enhances security of the system by ensuring that the complete set of functionality necessary for verification on the client-side is present only at content delivery time.

Figure 9:
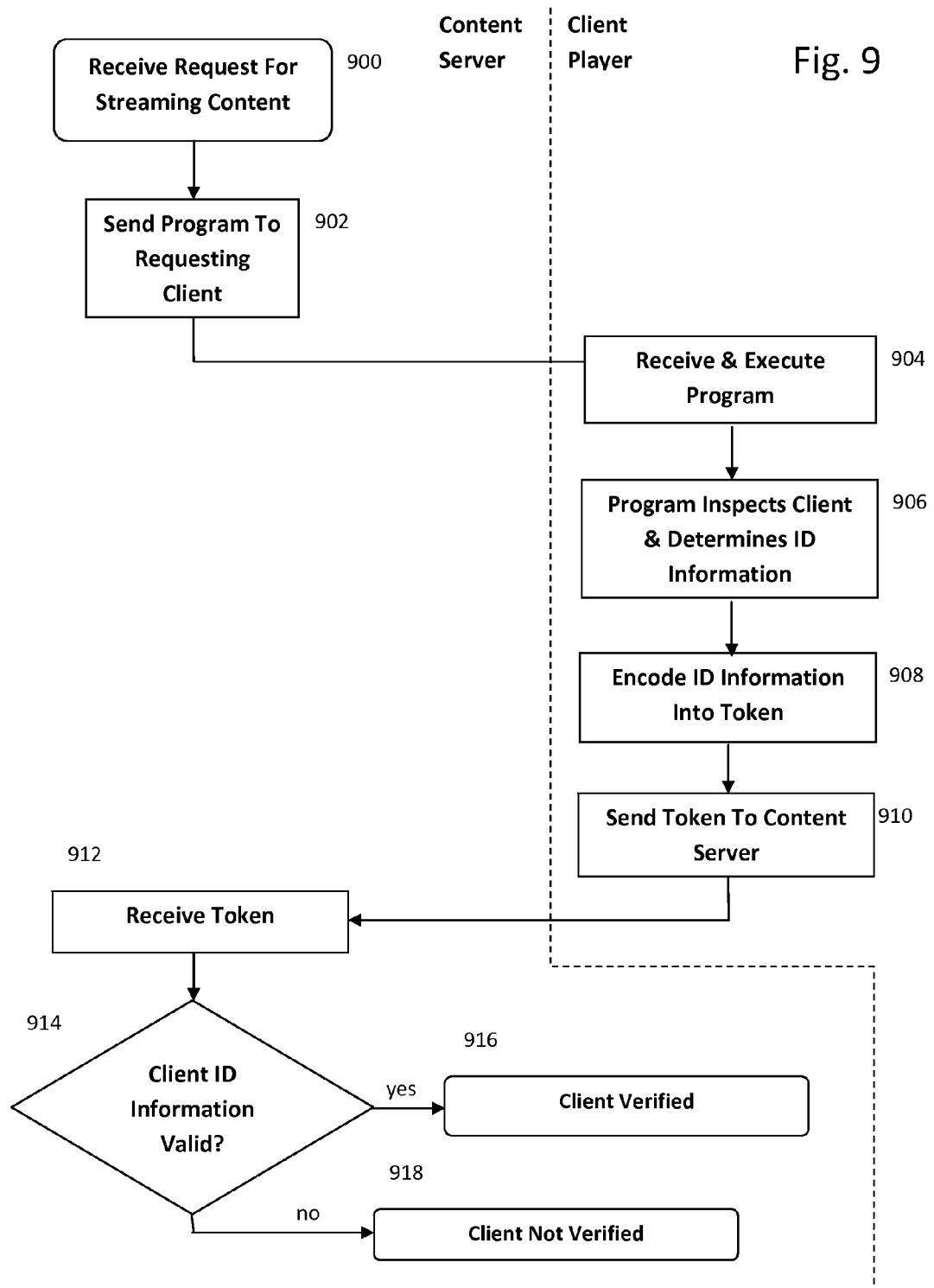
FIG. 9 is a flow chart illustrating one embodiment of a process for verifying a client player that has requested streaming content.

FIG. 9 illustrates one embodiment of a client player verification process using some of the techniques described above to verify a client player that has requested streaming content. In the illustrated embodiment, a content server receives a request for streaming content (step 900). The content server sends a program (e.g., as a SWF file, or otherwise) to the client (step 902). As noted, the program may be embedded in the beginning of a content stream, or sent before streaming content, etc. The client player receives and executes the instructions in the program, which determines information identifying the client player, encodes that information into a token, and returns the token to the content server (steps 904-910). The content server determines from the token (e.g. by decoding it or calculating its own token for comparison, or otherwise) whether client ID information is recognized (steps 912-914). If so, the client is verified and streaming may be continued with (subject, in some implementations, to a further authorization procedure for the client) (step 916). If not, the client is not verified, and the streaming is aborted or not initiated (step 918). The steps shown in FIG. 9 are provided merely by way of example and are not limiting.

5.3 Stream Encryption

The communications between the player and the HTTP proxy may be encrypted, e.g., using HTTPS, so as to advantageously obscure the verification scheme and to protect the streamed content.

6.0 Implementation

The clients, servers, and other devices described herein may be implemented on conventional computer systems, as modified by the teachings hereof, with the functional characteristics described above realized in software, hardware, or a combination thereof.

Software may include one or several discrete programs. Any given function may comprise part of any given module, process, execution thread, or other such programming construct. Generalizing, each function described above may be implemented as computer code, namely, as a set of computer instructions, for performing the functionality described via execution of that code using conventional means, e.g., a processor, a computer, a machine, a system, digital data processing device, or other apparatus. In one embodiment, such software may be implemented in a programming language that runs in conjunction with a DNS-compliant name server (e.g., BIND).

Figure 10:
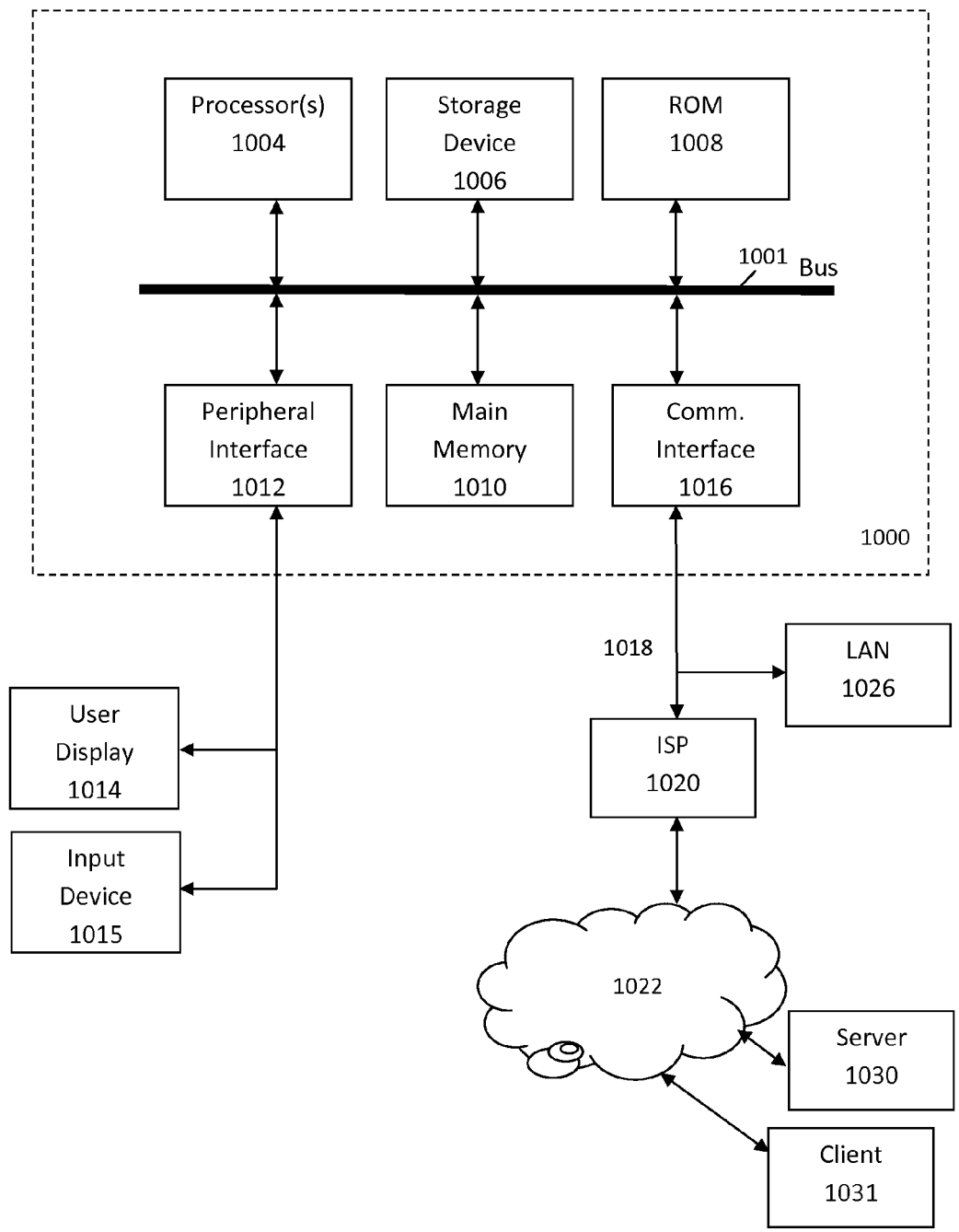
FIG. 10 is a simplified block diagram of a computer system with which the techniques disclosed herein can be implemented.

FIG. 10 is a block diagram that illustrates hardware in a computer system 1000 upon which such software may run in order to implement embodiments of the invention. The computer system 1000 may be embodied in a client device, server, personal computer, workstation, tablet computer, wireless device, mobile device, network device, router, hub, gateway, or other device.

Computer system 1000 includes a processor 1004 coupled to bus 1001. In some systems, multiple processor and/or processor cores may be employed. Computer system 1000 further includes a main memory 1010, such as a random access memory (RAM) or other storage device, coupled to the bus 1001 for storing information and instructions to be executed by processor 1004. A read only memory (ROM) 1008 is coupled to the bus 1001 for storing information and instructions for processor 1004. A non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

A peripheral interface 1012 communicatively couples computer system 1000 to a user display 1014 that displays the output of software executing on the computer system, and an input device 1015 (e.g., a keyboard, mouse, trackpad, touchscreen) that communicates user input and instructions to the computer system 1000. The peripheral interface 1012 may include interface circuitry, control and/or level-shifting logic for local buses such as RS-485, Universal Serial Bus (USB), IEEE 1394, or other communication links.

Computer system 1000 is coupled to a communication interface 1016 that provides a link (e.g., at a physical layer, data link layer, or otherwise) between the system bus 1001 and an external communication link. The communication interface 1016 provides a network link 1018. The communication interface 1016 may represent a Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the processor executing code. Such code is typically read from or provided by a non-transitory computer-readable medium, such as memory 1010, ROM 1008, or storage device 1006. Other forms of non-transitory computer-readable media include disks, tapes, magnetic media, CD-ROMs, optical media, RAM, PROM, EPROM, and EEPROM. Any other non-transitory computer-readable medium may also be employed. Executing code may also be read from network link 1018 (e.g., following temporary storage in an interface buffer, local memory, or other circuitry).

What is claimed is:

1. A method operative at a content server, comprising:
   receiving a request for multimedia content from a client player application;
   sending the multimedia content from the content server to the client player application and, at the time of sending the multimedia content from the content server to the client player application, also sending a program to the client player application, the program including one or more instructions that, when executed, cause the client player application to encode a user identifier into a token;
   receiving the token;
   extracting the user identifier from the token and determining whether the user is authorized to receive the multimedia content.

2. The method of claim 1, wherein the program includes one of a plurality of algorithms for encoding the user identifier into the token, the content server selecting the algorithm from amongst the plurality of algorithms.

3. The method of claim 1, wherein the program specifies one or more steps needed by the client player application for encoding the user identifier into the token.

4. The method of claim 1, wherein the request is an HTTP request.

5. A system, comprising:
a plurality of computers, each comprising a processor and memory storing instructions for operating the respective computer, the plurality of computers forming a distributed processing system for delivering multimedia content;
the plurality of computers operative as a result of executing the stored instructions to cause the distributed processing system to:
  receive a request for multimedia content from a client player application;
  send the multimedia content to the client player application and, at the time of sending the multimedia content from the computer to the client player application, also send a program that is embedded into the multimedia content to the client player application, the program including one or more instructions that, when executed, cause the client player application to encode a user identifier into a token;
  receive the token;
  extract the user identifier from the token;
  determine whether the user is authorized to receive the multimedia content based at least in part on the user identifier; and
  abort transmission of the multimedia content when the user is not authorized.

6. The system of claim 5, wherein the program includes one of a plurality of algorithms for encoding the user identifier into the token, the distributed processing system selecting the algorithm from amongst the plurality of algorithms.

7. The system of claim 5, wherein the program specifies one or more steps needed by the client player application for encoding the user identifier into the token.

8. The system of claim 5, wherein the request is an HTTP request.

* * * * *